US010345950B2

(12) United States Patent
Yoon et al.

(10) Patent No.: US 10,345,950 B2
(45) Date of Patent: Jul. 9, 2019

(54) COMBINED FINGERPRINT RECOGNITION TOUCH SCREEN DEVICE, METHOD OF DRIVING THE TOUCH SCREEN DEVICE, AND ELECTRONIC DEVICE INCLUDING THE TOUCH SCREEN DEVICE

(71) Applicant: SAMSUNG ELECTRONICS CO., LTD., Suwon-si (KR)

(72) Inventors: Daekun Yoon, Suwon-si (KR); Byungkyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 15/352,749

(22) Filed: Nov. 16, 2016

(65) Prior Publication Data

US 2017/0336906 A1   Nov. 23, 2017

(30) Foreign Application Priority Data

May 17, 2016 (KR) ........................ 10-2016-0060212

(51) Int. Cl.
*G06F 3/041* (2006.01)
*G06F 3/044* (2006.01)
*G06K 9/00* (2006.01)

(52) U.S. Cl.
CPC ............ *G06F 3/0416* (2013.01); *G06F 3/044* (2013.01); *G06K 9/00013* (2013.01); *G06F 2203/04106* (2013.01)

(58) Field of Classification Search
CPC ................... G06F 3/0416; G06F 3/044; G06F 2203/04106; G06K 9/00013

(Continued)

(56) References Cited

U.S. PATENT DOCUMENTS 5,963,679 A   10/1999   Setlak
8,866,347 B2   10/2014   Benkley, III
(Continued)

FOREIGN PATENT DOCUMENTS

EP   2629183 A2   8/2013
EP   2 772 838 A1   9/2014
(Continued)

OTHER PUBLICATIONS

Communication dated Sep. 22, 2017 by the European Patent Office in counterpart European Patent Application No. 17151846.7.
(Continued)

*Primary Examiner* — Amare Mengistu
*Assistant Examiner* — Gloryvid Figueroa-Gibson
(74) *Attorney, Agent, or Firm* — Sughrue Mion, PLLC

(57) ABSTRACT

A touch screen device includes a touch pad including driving lines and sensing lines intersecting the driving lines, a driver configured to apply a driving signal to the driving lines, a signal output collector configured to receive a touch signal from the sensing lines, and a controller configured to control the driver and the signal output collector. The controller is further configured to control the driver to perform primary scanning to sequentially apply the driving signal to first driving lines disposed at predetermined intervals, among the driving lines, determine a scanning region, based on a first driving line where a touch is sensed among the first driving lines to which the driving signal is applied, and control the driver to perform secondary scanning to sequentially apply the driving signal to second driving lines included in the determined scanning region, among the driving lines.

22 Claims, 7 Drawing Sheets

(58) Field of Classification Search
USPC .......................................................... 345/174
See application file for complete search history.

(56) References Cited

U.S. PATENT DOCUMENTS

| | | | | |
|---|---|---|---|---|
| 2011/0032206 A1* | 2/2011 | Kitamura | ................ | G06F 1/169 |
| | | | | 345/173 |
| 2011/0074731 A1 | 3/2011 | Inoue et al. | | |
| 2012/0268248 A1* | 10/2012 | Hiraide | ................ | H04L 9/3231 |
| | | | | 340/5.83 |
| 2013/0215049 A1* | 8/2013 | Lee | ........................ | G06F 3/0416 |
| | | | | 345/173 |
| 2013/0265282 A1* | 10/2013 | Nakagawa | ............ | G06F 3/0416 |
| | | | | 345/174 |
| 2014/0333328 A1 | 11/2014 | Nelson et al. | | |
| 2014/0341446 A1 | 11/2014 | Hare et al. | | |
| 2015/0077370 A1 | 3/2015 | Kim et al. | | |
| 2015/0109217 A1 | 4/2015 | Zhu et al. | | |
| 2015/0109244 A1* | 4/2015 | Jang | ........................ | G06F 3/0416 |
| | | | | 345/174 |
| 2015/0346865 A1* | 12/2015 | Hong | ........................ | G06F 3/044 |
| | | | | 345/174 |
| 2015/0363632 A1 | 12/2015 | Ahn et al. | | |
| 2016/0371533 A1* | 12/2016 | Liu | ........................ | G06K 9/00006 |

FOREIGN PATENT DOCUMENTS

| | | |
|---|---|---|
| KR | 1020150087802 A | 7/2015 |
| KR | 1020150144666 A | 12/2015 |

OTHER PUBLICATIONS

Communication dated Jul. 4, 2017, issued by the European Patent Office in counterpart European Application No. 17151846.7.

Chris Stein et al: "Fingerphoto Recognition with Smartphone Cameras", Biometrics Special Interest Group (BIOSIG), 2012 BIOSIG—Proceedings of the International Conference of the, IEEE, Sep. 6, 2012, pp. 1-12, XP032243117, (12 pages total).

* cited by examiner

COMBINED FINGERPRINT RECOGNITION TOUCH SCREEN DEVICE, METHOD OF DRIVING THE TOUCH SCREEN DEVICE, AND ELECTRONIC DEVICE INCLUDING THE TOUCH SCREEN DEVICE

CROSS-REFERENCE TO RELATED APPLICATION

This application claims priority from Korean Patent Application No. 10-2016-0060212, filed on May 17, 2016, in the Korean Intellectual Property Office, the disclosure of which is incorporated herein by reference in its entirety.

BACKGROUND

1. Field

Apparatuses and methods consistent with exemplary embodiments relate to a combined fingerprint recognition touch screen device, and more particularly, to a combined fingerprint recognition on-screen touch screen device capable of performing both fingerprint recognition and touch sensing on a display panel, a method of driving the touch screen device, and an electronic device including the touch screen device.

2. Description of the Related Art

Personal authentication using personal unique characteristics such as fingerprints, voice, face, hands, irises, and the like is gradually increasing. Personal authentication is usually used in banking devices, access control systems, mobile devices, laptop computers, etc., and recently, with the wide spread of mobile devices like smartphones, a fingerprint recognition device for personal authentication is being adopted to protect security information stored in the smartphones.

In the smartphone, a touch screen device is attached onto a display panel to provide an intuitive input interface to a user, and generally, a fingerprint recognition device is provided separately from the touch screen device to recognize a fingerprint only when a position is touched thereon.

SUMMARY

Exemplary embodiments may address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a touch screen device a touch pad including driving lines and sensing lines intersecting the driving lines, a driver configured to apply a driving signal to the driving lines, a signal output collector configured to receive a touch signal from the sensing lines, and a controller configured to control the driver and the signal output collector. The controller is further configured to control the driver to perform primary scanning to sequentially apply the driving signal to first driving lines disposed at predetermined intervals, among the driving lines, determine a scanning region, based on a first driving line where a touch is sensed among the first driving lines to which the driving signal is applied, and control the driver to perform secondary scanning to sequentially apply the driving signal to second driving lines included in the determined scanning region, among the driving lines.

Each of the predetermined intervals may be of n driving lines, the predetermined intervals may be over an entire region of the touch pad, and n may be a natural number that is greater than 1.

The controller may be further configured to control the driver to perform the primary scanning to sequentially apply the driving signal to $(kn+m)^{th}$ driving lines at the predetermined intervals, starting from an $m^{th}$ driving line, among the driving lines, n may be a natural number that is greater than 1, m may be a natural number that is greater than or equal to 1, and k may be an integer that is greater than or equal to 0.

The determined scanning region may be from the first driving line where the touch is sensed to a second driving line immediately before a third driving line where the touch is not sensed after the first driving line, among the first driving lines.

The controller may be further configured to determine whether a first contact strength in a last driving line disposed in a last position among third driving lines where the touch is sensed among the first driving lines, is less than a second contact strength in fourth driving lines among the third driving lines, by a reference value or more, and the determined scanning region may be from the first driving line where the touch is sensed to a second driving line immediately before the last driving line where the touch is sensed, in response to the determination that the first contact strength is less than the second contact strength by the reference value or more.

The controller may be further configured to determine the first contact strength and the second contact strength from capacitance variations in the respective third driving lines.

The touch panel may further include driving island sets that are spaced apart from each other, and each of the driving island sets may include a respective portion of the driving lines.

A width of each of the driving island sets may be about 4 mm to about 5 mm, and an interval between each adjacent pair of the driving island sets may be about 4 mm to about 5 mm.

The controller may be further configured to perform the primary scanning to sequentially apply the driving signal to one driving line among each of the driving island sets.

The controller may be further configured to determine the scanning region as a driving island set including third driving lines where the touch is sensed, among the driving island sets to which the driving signal is applied.

A pitch between the driving lines may be about 70 μm.

The controller may be further configured to operate in a fingerprint recognition mode for recognizing a fingerprint or in a touch sensing mode for sensing a touch, and repeat the primary scanning in the touch sensing mode.

The controller may be further configured to, in the fingerprint recognition mode, after the primary scanning, determine whether a region that is touched on the touch pad is maintained in a same position on the touch pad for a period of time or longer, and perform the secondary scanning in response to the determination that the touched region touched is maintained in the same position on the touch pad for the period of time or longer.

According to an aspect of another exemplary embodiment, there is provided an electronic device including a display panel, and a touch screen device including a touch pad including driving lines and sensing lines intersecting the driving lines, a driver configured to apply a driving signal to the driving lines, a signal output collector configured to receive a touch signal from the sensing lines, and a controller configured to control the driver and the signal output collector. The controller is further configured to control the driver to perform primary scanning to sequentially apply the driving signal to first driving lines disposed at predetermined intervals, among the driving lines, determine a scanning region, based on a first driving line where a touch is sensed among the first driving lines to which the driving signal is applied, and control the driver to perform secondary scanning to sequentially apply the driving signal to second driving lines included in the determined scanning region, among the driving lines.

According to an aspect of another exemplary embodiment, there is provided a method of driving a touch screen device including a touch pad including driving lines and sensing lines intersecting the sensing lines, the method including performing primary scanning to sequentially apply a driving signal to first driving lines disposed at predetermined intervals, among the driving lines, determining a scanning region, based on a first driving line where a touch is sensed among the first driving lines to which the driving signal is applied, and performing secondary scanning to sequentially apply the driving signal to second driving lines included in the determined scanning region, among the driving lines.

The performing of the primary scanning may further include sequentially applying the driving signal to $(kn+m)^{th}$ driving lines at the predetermined intervals, starting from an $m^{th}$ driving line, among the driving lines, n may be a natural number that is greater than 1, m may be a natural number that is greater than or equal to 1, and k may be an integer that is greater than or equal to 0.

The determined scanning region may be from the first driving line where the touch is sensed to a second driving line immediately before a third driving line where the touch is not sensed after the first driving line, among the first driving lines.

The method may further include determining whether a first contact strength in a last driving line disposed in a last position among third driving lines where the touch is sensed among the first driving lines, is less than a second contact strength in fourth driving lines among the third driving lines, by a reference value or more, and the determined scanning region may be from the first driving line where the touch is sensed to a second driving line immediately before the last driving line where the touch is sensed, in response to the determination that the first contact strength is less than the second contact strength by the reference value or more.

The touch panel may further include driving island sets that are spaced apart from each other, each of the driving island sets may include a respective portion of the driving lines, the performing of the primary scanning may include sequentially applying the driving signal to one driving line among each of the driving island sets, and the determining of the scanning region may include determining the scanning region as a driving island set including third driving lines where the touch is sensed, among the driving island sets to which the driving signal is applied.

The method may further include operating in a fingerprint recognition mode for recognizing a fingerprint or in a touch sensing mode for sensing a touch, and repeating the primary scanning in the touch sensing mode.

The method may further include, in the fingerprint recognition mode, after the primary scanning, determining whether a region that is touched on the touch pad is maintained in a same position on the touch pad for a first period of time or longer, and the performing of the secondary scanning may include performing the secondary scanning in response to the determination that the touched region touched is maintained in the same position on the touch pad for the first period of time or longer.

The method may further include performing a user authentication to compare an image that is obtained through the secondary scanning with a previously-registered fingerprint image.

The method may further include determining whether there is no effective touch on the touch pad for a second period of time or longer in response to the determination that the touched region touched is not maintained in the same position on the touch pad for the first period of time or longer, and ending the fingerprint recognition mode in response to the determination that there is no effective touch on the touch pad for the second period time or longer.

According to an aspect of another exemplary embodiment, there is provided a touch screen device including a touch pad including driving lines and sensing lines intersecting the driving lines, a driver, and a controller configured to control the driver to sequentially apply a driving signal to first driving lines disposed at predetermined intervals, among the driving lines, determine a scanning region, based on a first driving line where a touch is sensed among the first driving lines to which the driving signal is applied, and control the driver to sequentially apply the driving signal to second driving lines included in the determined scanning region, among the driving lines.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
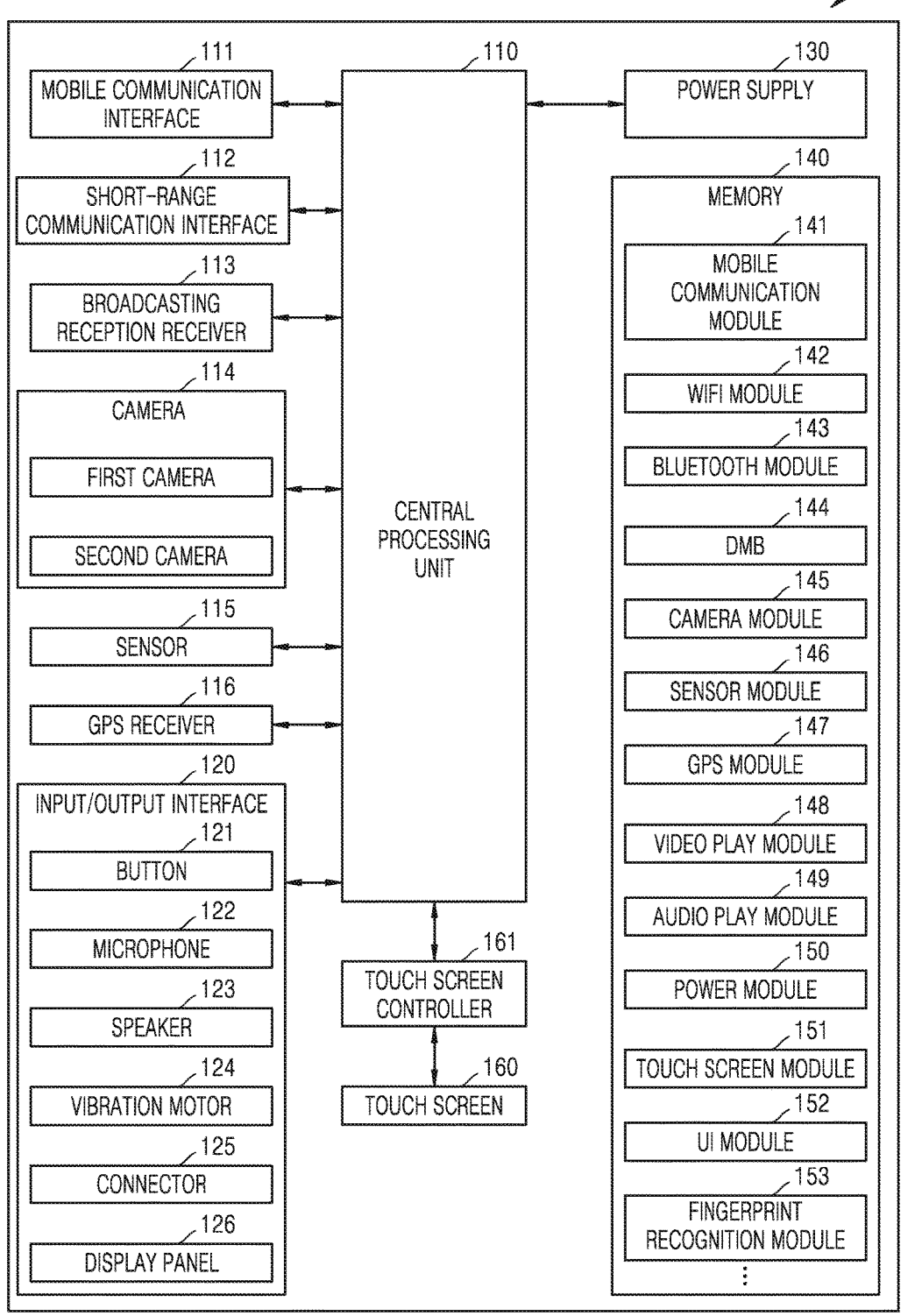
FIG. 1 is a block diagram illustrating a structure of an electronic device including a combined fingerprint recognition touch screen device, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

As used herein, the term "and/or" includes any and all combinations of one or more of the associated listed items. Expressions such as "at least one of," when preceding a list of elements, modify the entire list of elements and do not modify the individual elements of the list.

In a layer structure described below, an expression such as "above" or "on" may include not only the meaning of "immediately on/under/to the left/to the right in a contact manner," but also the meaning of "on/under/to the left/to the right in a non-contact manner.

FIG. 1 is a block diagram illustrating a structure of an electronic device including a combined fingerprint recognition and touch screen device, according to an exemplary embodiment. For example, an electronic device 100 may be a small-size mobile device including a smartphone, a smart watch, a tablet personal computer (PC), laptop computer, a personal digital assistant (PDA), a portable multimedia player (PMP), or the like. Referring to FIG. 1, the electronic device 100 includes a central processing unit 110, a mobile communication interface 111, a short-range communication interface 112, a broadcasting receiver 113, a camera 114, a sensor 115, a global positioning system (GPS) receiver 116, an input/output interface 120, a power supply 130, a memory 140, a touch screen device 160.

The communication interface 111 transmits and receives a radio signal to and from any one or any combination of a base station, an external terminal, and a server over a mobile communication network. Herein, the radio signal may include various forms of data corresponding to transmission/reception of a voice call signal, a video communication call signal, or a text/multimedia message. The short-range communication interface 112 performs a short-range wireless communication function. The communication interface 150 may include, but is not limited to, a Bluetooth Low Energy (BLE) communication interface, a near field communication (NFC) unit, a wireless local area network (WLAN) (WiFi) communication interface, a ZigBee communication interface, an infrared Data Association (IrDA) communication interface, a WiFi Direct (WFD) communication interface, an ultra wideband (UWB) communication interface, and an Ant+ communication interface.

The broadcasting receiver 113 receives a digital multimedia broadcasting (DMB) broadcast signal. The camera 114 may include a lens and optical devices for capturing a still image or a moving image, and includes a first camera and a second camera. The sensor 115 may include a gravity sensor for sensing motion of the electronic device 100, an illumination sensor for sensing a brightness of light, a proximity sensor for sensing proximity of a person, a motion sensor for sensing motion of a person, etc. The GPS receiver 116 receives a GPS signal from an artificial satellite. By using the GPS signal, various services may be provided to a user.

The input/output interface 120 provides an interface with an external device or the user, and includes a button 121, a microphone 122, a speaker 123, a vibration motor 124, a connector 125, and a display panel 126. The power supply 130 is connected with a battery or an external power source to supply power for the electronic device 100.

The memory 140 stores various programs executed by the central processing unit 110. The central processing unit 110 controls programs stored in the memory 140 and operations of the above-described components. The programs stored in the memory 140 may be classified depending on their functions into a plurality of modules, e.g., a mobile communication module 141, a WiFi module 142, a Bluetooth module 143, a DMB module 142, a camera module 145, a sensor module 146, a GPS module 147, a video play module 148, an audio play module 149, a power module 150, a touch screen module 151, a UI module 152, and a fingerprint recognition module 153.

The touch screen device 160 may be a combined fingerprint recognition touch screen device 160. The combined fingerprint recognition touch screen device 160 is configured to perform both fingerprint recognition for user authentication and touch sensing for inputting various commands and information to the electronic device 100 with a touch of a finger. A touch screen controller 161 delivers fingerprint information or a touch input, which is input through the combined fingerprint recognition touch screen device 160, to the central processing unit 110.

Figure 2:
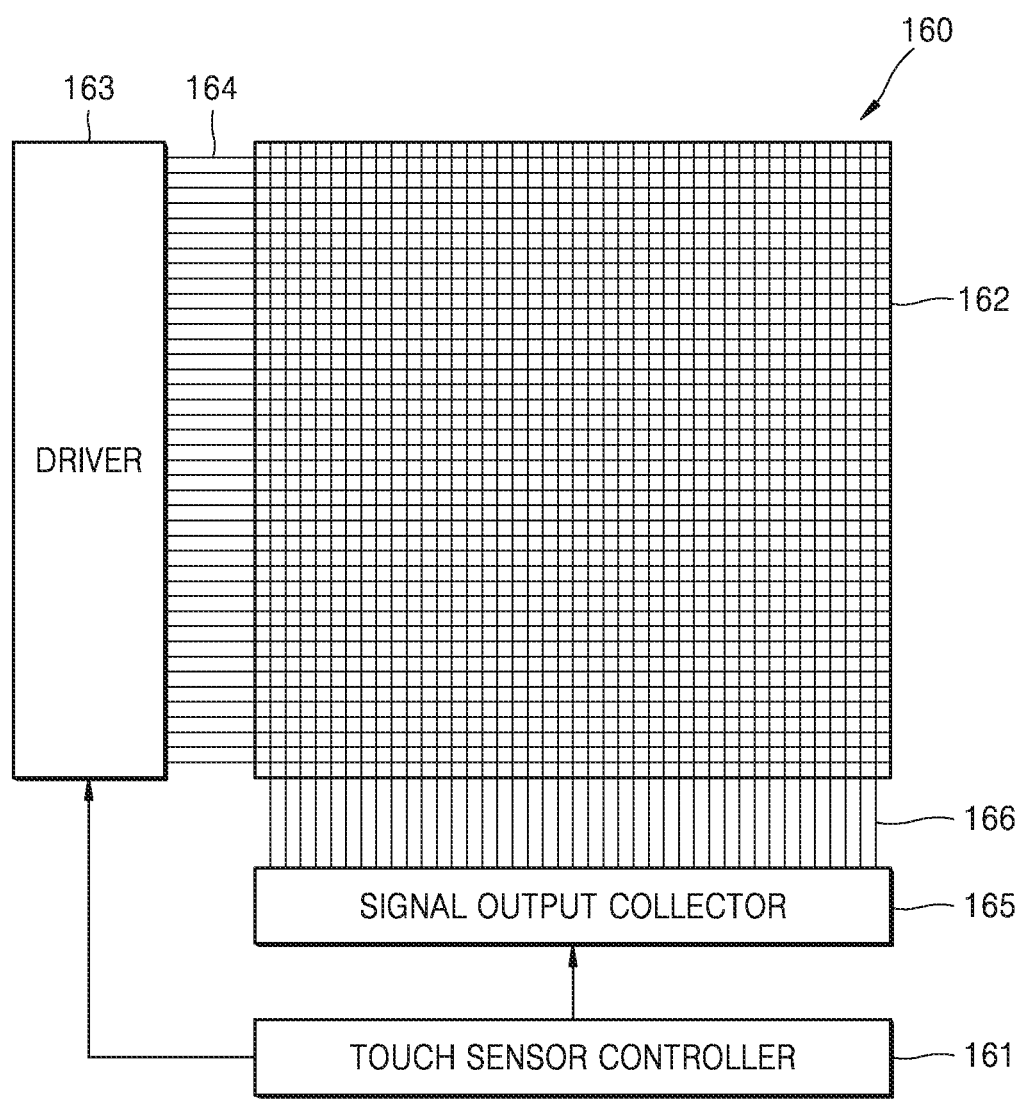
FIG. 2 is a block diagram illustrating a structure of a combined fingerprint recognition touch screen device according to an exemplary embodiment.

FIG. 2 is a block diagram illustrating a structure of the combined fingerprint recognition touch screen device 160 according to an exemplary embodiment. Referring to FIG. 2, the combined fingerprint recognition touch screen device 160 includes a touch panel 162 in which a plurality of driving lines 164 and a plurality of sensing lines 166 are arranged to intersect with one another, a driver 163 that sequentially provides a driving signal to the plurality of driving lines 164, and a signal output collector 165 that collects a touch signal from the plurality of sensing lines 166 and outputs the touch signal as a digital signal. The touch screen controller 161 controls operations of the driver 163 and the signal output collector 165 in cooperation with the touch screen module 151 and the central processing unit 110. The touch panel 162 may be, for example, arranged on the display panel 126 of the electronic device 100.

The combined fingerprint recognition touch screen device 160 may be, for example, of a capacitance type. In this case, at a node at which the plurality of driving lines 164 and the plurality of sensing lines 166 intersect, a self capacitance or a mutual capacitance change occurs due to a touch input or a fingerprint input, and coordinates of a touch input or an image of a touched fingerprint may be calculated from an electric capacitance change at a plurality of touched nodes. Thus, a node at which the driving lines 164 and the sensing lines 166 intersect may serve as a pixel for sensing a touch input or a fingerprint input. While the driving lines 164 and the sensing lines 166 are marked with thin solid lines for convenience in the drawing, in practice, a plurality of transparent electrode patterns may be arranged along the driving lines 164 and the sensing lines 166.

To obtain a resolution that is high enough for fingerprint recognition, the driving lines 164 and the sensing lines 166 of the touch panel 162 may be arranged at shorter intervals than driving lines and sensing lines of touch panels that sense only a touch, and sizes of electrode patterns may also be small. For example, a pitch between the driving lines 164 may be about 70 µm, and a pitch between the sensing lines 166 may be about 70 µm. In this case, about 60 through 70 driving lines 164 and sensing lines 166 may be arranged in an area of about 4 mm through about 5 mm.

When the combined fingerprint recognition touch screen device 160 senses a fingerprint or a touch, the driver 163 sequentially applies a driving signal to the driving lines 164 from the first line to the last line. For example, when a driving signal is applied to the first driving line 164, the signal output collector 165 may simultaneously receive an output signal from the plurality of sensing lines 166. Then, it may be determined at which node a touch is generated among nodes at which the first driving line 164 intersects the plurality of sensing lines 166. The driver 163 then applies a driving signal to the second driving line 164. In this way, scanning for the entire region of the touch panel 162 may be performed.

Because the combined fingerprint recognition touch screen device 160 has more driving lines 164 than touch panels that sense only a touch, a time for performing scanning with respect to the entire region of the touch panel 162 may increase. For example, if a driving signal is applied to all the driving lines 164 from the first line to the last line one-by-one during fingerprint recognition, a time for fingerprint recognition may increase. An area of a fingerprint of a finger is much smaller than an area of the display panel 126 and the touch panel 162, and thus, if only a region of the touch panel 162 the finger touches is scanned, a time for fingerprint recognition may be reduced. In other words, by previously recognizing a position at which the finger is situated on the touch panel 162 and obtaining a fingerprint image of the position, speedy fingerprint recognition becomes possible.

Figure 3:
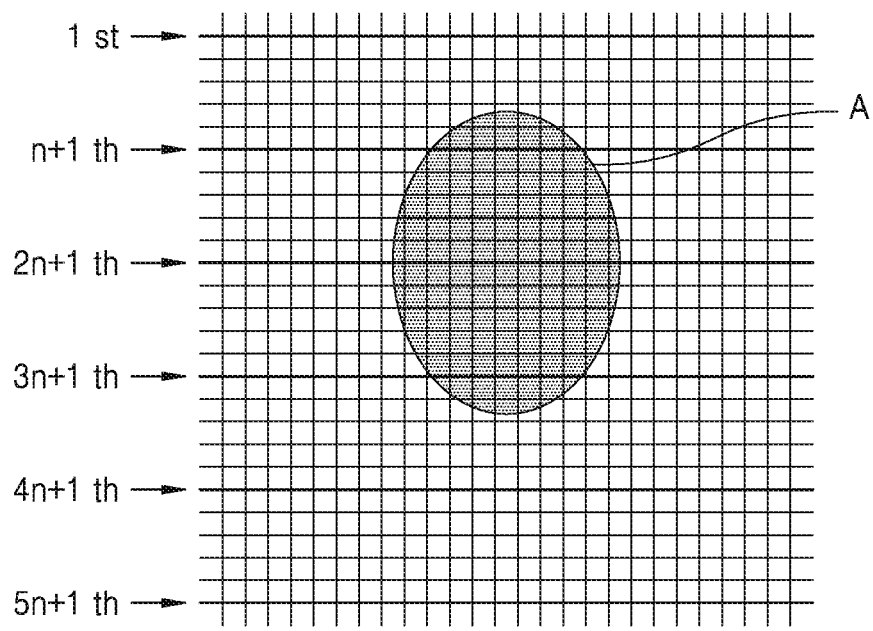
FIG. 3 is a diagram illustrating a process of searching for a region where a finger is situated on a combined fingerprint recognition touch screen device, according to an exemplary embodiment.
Figure 4:
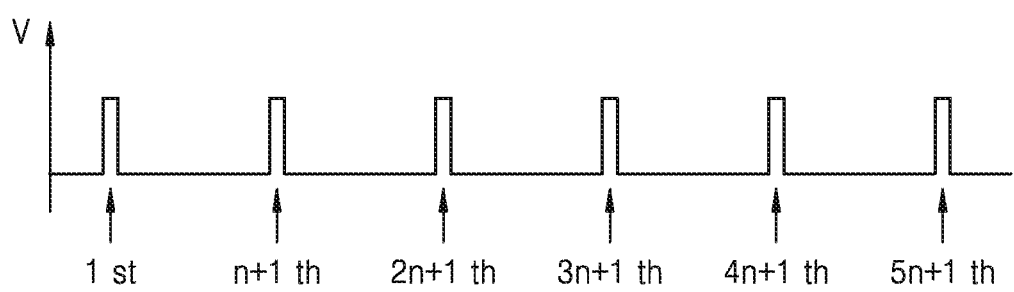
FIG. 4 is a graph illustrating a driving signal applied to driving lines in the process of FIG. 3.

FIG. 3 is a block diagram illustrating a process of searching for a region where a finger is situated on the combined fingerprint recognition touch screen device 160, according to an exemplary embodiment, and FIG. 4 is a graph illustrating a driving signal applied to the driving lines 164 in the process of FIG. 3. Referring to FIGS. 3 and 4, the combined fingerprint recognition touch screen device 160 may primarily search for a region where a finger is situated on the touch panel 162 by performing primary scanning before obtaining a fingerprint image. In this case, speedy scanning may be performed with respect to the entire region of the touch panel 162 by applying a driving signal (V) to some of the driving lines 164. For example, during primary scanning, a driving signal may be sequentially applied to the entire region of the touch panel 162 at intervals of n lines. Herein, n is a natural number greater than 1. That is, as marked with thick solid lines in FIG. 3, the driving signal is applied to the first driving line 164, and then the driving signal is applied to a $(n+1)^{th}$ driving line 164. Then, the driving signals are sequentially applied to a $(2n+1)^{th}$ driving line 164, a $(3n+1)^{th}$ driving line 164, and a $(4n+1)^{th}$ driving line 164.

Although it has been described that primary scanning starts from the first driving line 164 in FIG. 3, primary scanning may start from an $m^{th}$ driving line 164 by considering that a user may contact a finger around the center of the touch panel 162. Herein, m is a natural number greater than 1. For example, a driving signal may be sequentially applied to the driving lines 164 in an order of the $m^{th}$ driving line 164, an $(n+m)^{th}$ driving line 164, a $(2n+m)^{th}$ driving line 164, a $(3n+m)^{th}$ driving line 164, and a $(4n+m)^{th}$ driving line 164. Hereinbelow, for ease of a description, it will be described that primary scanning starts from the first driving line 164. The driving signal is sequentially applied to $(kn+m)^{th}$ driving lines, where n and m are natural numbers greater than 1 and k is an integer greater than or equal to 0.

By scanning the entire region of the touch panel 162 in this way, a time for primary scanning may be reduced to about 1/n of a time for sequentially applying a driving signal to all the driving lines 164 one-by-one. For example, a driving signal may be applied at intervals of about 50 through about 150 lines. Then, a time for primary scanning may be about 1/50 through about 1/150 of a time for sequentially applying a driving signal to all the driving lines 164 of the touch panel 162 one-by-one. As described above, a pitch between the driving lines 164 is about 70 µm, and thus if a driving signal is applied at intervals of about 50 through about 150 lines, a finger's position is searched for on the touch panel 162 at intervals of about 3 mm through about 10 mm. A size of a fingerprint is about 2 cm through about 4 cm, and thus the position of the finger may be accurately recognized by searching for the position of the finger at intervals of about 3 mm through about 10 mm.

The combined fingerprint recognition touch screen device 160 then precisely performs secondary scanning with respect to the region where the finger is situated, recognized during primary scanning. For example, assuming that a region marked with "A" in an example of FIG. 3 is a region A where a finger contacts on the touch panel 162, a touch is sensed in the $(n+1)^{th}$, $(2n+1)^{th}$, and $(3n+1)^{th}$ driving lines 164. If the touch is fixed without moving for a predetermined time or more, it is determined that a finger contacts the touch panel 162 for fingerprint recognition, and secondary scanning is performed.

Figure 5:
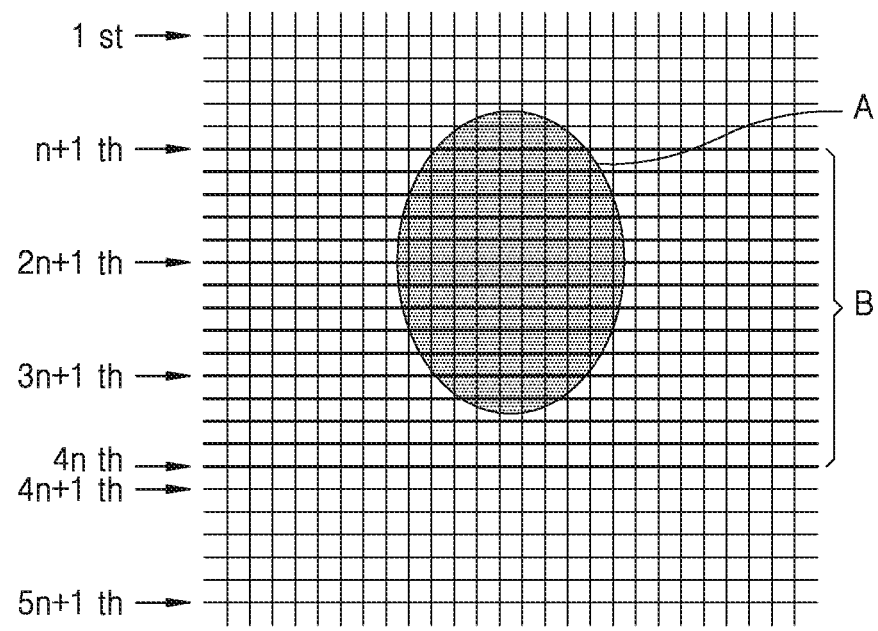
FIG. 5 is a diagram illustrating a process of performing fingerprint recognition with respect to a region where a finger is situated on a combined fingerprint recognition touch screen device, according to an exemplary embodiment.
Figure 6:
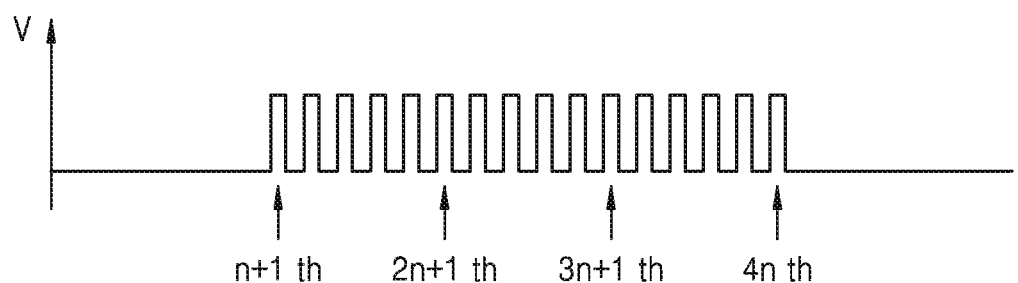
FIG. 6 is a graph illustrating a driving signal applied to driving lines in the process of FIG. 5.

FIG. 5 is a diagram illustrating a process of performing fingerprint recognition with respect to a region where a finger is situated on the combined fingerprint recognition touch screen device 160, according to an exemplary embodiment, and FIG. 6 is a graph illustrating a driving signal applied to the driving lines 164 in the process of FIG. 5. Referring to FIGS. 5 and 6, secondary scanning starts from the driving line 164 where a touch is sensed, that is, the $(n+1)^{th}$ driving line 164. After scanning in the $(n+1)^{th}$ driving line 164, scanning is performed to the driving line 164 in which a touch is not sensed, e.g., the driving line 164 immediately before the $(4n+1)^{th}$ driving line 164, i.e., the $4n^{th}$ driving line 164. For example, the driver 163 sequentially applies a driving signal (V) to all the driving lines 164 one-by-one from the $(n+1)^{th}$ driving line 164 to the $4n^{th}$ driving line 164 during secondary scanning.

In FIG. 5, a secondary scanning region B determined in this way is marked with thick solid lines. The secondary scanning region B may be determined based on the driving line 164 where the touch is sensed during primary scanning. The secondary scanning region B may not completely match the region A where the finger is actually situated. For example, the region A where the finger is situated in FIG. 5 may protrude forward with respect to the secondary scanning region B. The secondary scanning region B may extend to a portion where the finger is not situated. However, the secondary scanning region B may overlap with a most part of the region A where the finger is situated, and thus the fingerprint may be sufficiently recognized from the secondary scanning region B. As such, when fingerprint recognition is performed, the region A where the finger is situated is rapidly searched for by primary scanning, and precise scanning is performed with respect to the secondary scanning region B determined by primary scanning, thereby reducing a time for fingerprint recognition.

Meanwhile, in a touch sensing mode in which a touch sensing function is performed without fingerprint recognition, precise sensing is not required, and thus the combined fingerprint recognition touch screen device 160 may repeat the above-described primary scanning operation. For example, the combined fingerprint recognition touch screen device 160 may operate in a touch sensing mode to repeat primary scanning, and may operate in a fingerprint recognition mode to perform primary scanning and then secondary scanning if fingerprint recognition is needed.

To further reduce a time for secondary scanning, scanning with respect to a boundary of a finger may be skipped in some cases, thus reducing the size of the secondary scanning region B.

Figure 7:
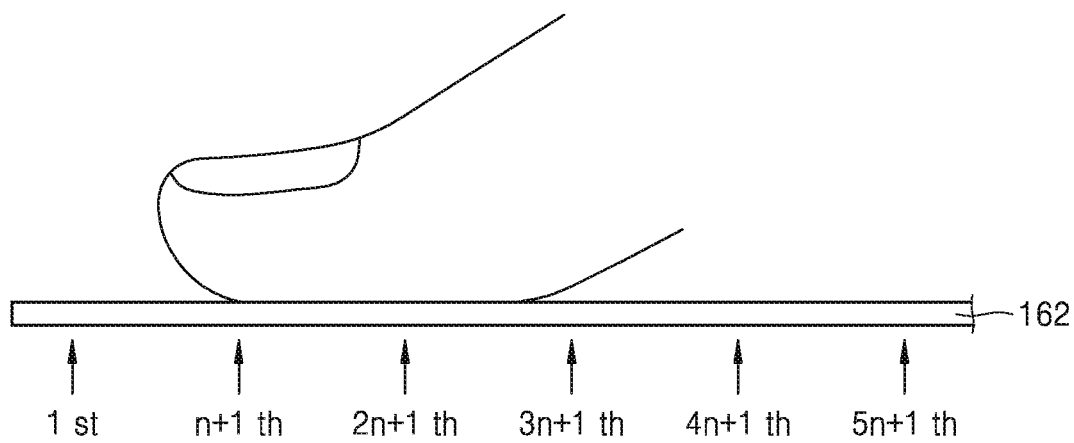
FIG. 7 is a diagram illustrating a state in which a finger contacts a touch panel, according to an exemplary embodiment.

FIG. 7 is a diagram illustrating a state in which a finger contacts the touch panel 162, according to an exemplary embodiment. As illustrated in FIG. 7, if a position of the $(3n+1)^{th}$ driving line 164 is in a boundary of a region where the finger contacts the touch panel 162, secondary scanning may be omitted from the $(3n+1)^{th}$ driving line 164 to reduce a fingerprint recognition time.

To this end, before second scanning starts after completion of primary scanning, a contact strength in the driving line 164 that is the last line of the driving lines 164 in which the touch is sensed may be compared with a contact strength in the other driving lines 164. If the contact strength in the last driving line 164 of the driving lines 164 where the touch is sensed is much smaller than contact strengths in the other driving lines 164, the position of the last driving line 164 where the touch is sensed may be determined as a boundary of the region the finger contacts on the touch panel 162. Herein, the contact strength may be determined as a capacitance variation in each driving line 164. For example, if a capacitance variation in the last driving line 164 of the driving lines 164 where the touch is sensed is less than capacitance variations in the other driving lines 164 by a reference value (e.g., ½) or more, the position of the last driving line 164 where the touch is sensed may be determined as the boundary of the region the finger contacts on the touch panel 162. The secondary scanning region B may be determined from the first driving line 164 where the touch is sensed to the driving line 164 immediately before the last driving line 164 where the touch is sensed.

In the example illustrated in FIG. 3, the touch may be sensed in the $(n+1)^{th}$, $(2n+1)^{th}$, and $(3n+1)^{th}$ driving lines 164. Then, the touch screen controller 161 compares a capacitance variation in the $(3n+1)^{th}$ driving line 164 with a capacitance variation in the $(n+1)^{th}$ and $(2n+1)^{th}$ driving lines 164. If the capacitance variation in the $(3n+1)^{th}$ driving line 164 is nearly similar to the capacitance variation in the $(n+1)^{th}$ and $(2n+1)^{th}$ driving lines 164, the secondary scanning region B may be determined from the $(n+1)^{th}$ driving line 164 to the $4n^{th}$ driving line 164 as illustrated in FIG. 5. However, if the capacitance variation in the $(3n+1)^{th}$ driving line 164 is less than the capacitance variations in the $(n+1)^{th}$ driving line 164 and the $(2n+1)^{th}$ driving line 164 by a reference value or more (e.g., less than ½ of the capacitance variations in the $(n+1)^{th}$ driving line 164 and the $(2n+1)^{th}$ driving line 164), a position of the $(3n+1)^{th}$ driving line 164 may be determined to be in a boundary of a region the finger contacts on the touch panel 162, and secondary scanning may not be performed from the $(3n+1)^{th}$ driving line 164. That is, the secondary scanning region B may be determined from the $(n+1)^{th}$ driving line 164 to the $3n^{th}$ driving line 164.

Figure 8:
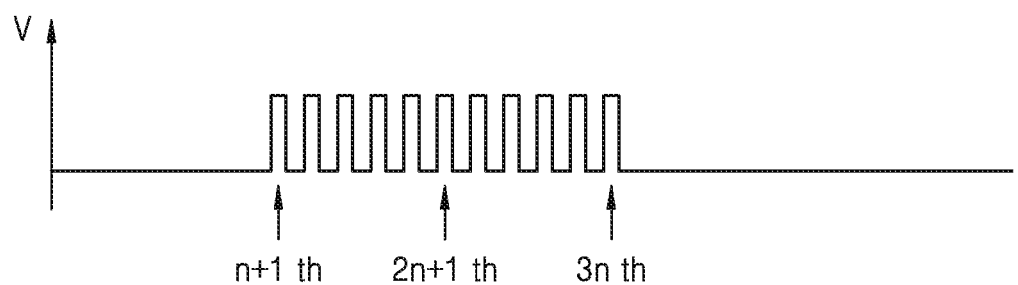
FIG. 8 is a graph illustrating a driving signal applied to driving lines during the state of FIG. 7.

FIG. 8 is a graph illustrating a driving signal applied to the driving lines 164 in the state of FIG. 7. Referring to FIG. 8, the secondary scanning is performed from the $(n+1)^{th}$ driving line 164 to the $3n^{th}$ driving line 164. Then, the number of driving lines 164 in the secondary scanning region B is reduced, thereby more rapidly completing secondary scanning. Hence, a time for fingerprint recognition may be further reduced.

Figure 9:
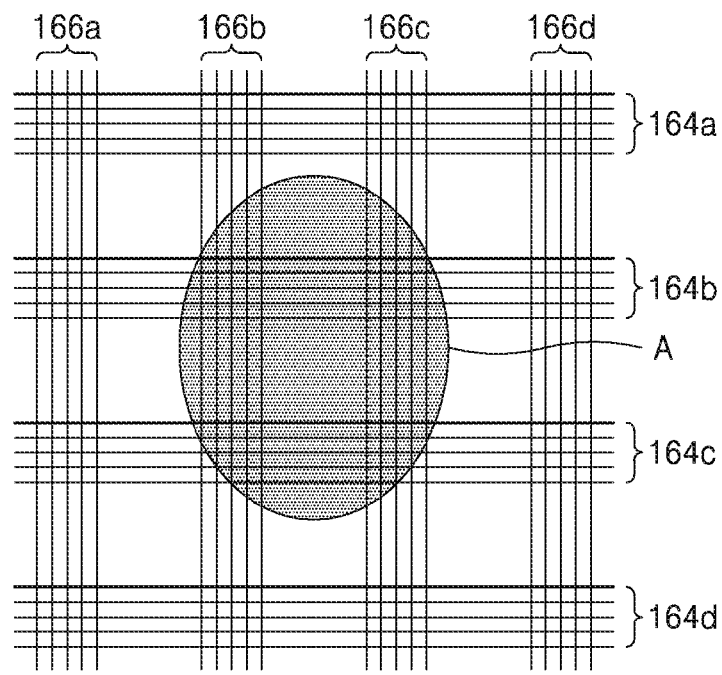
FIG. 9 is a diagram illustrating a process of searching for a region where a finger is situated on a combined fingerprint recognition touch screen device, according to another exemplary embodiment.

FIG. 9 is a diagram illustrating a process of searching for a region where a finger is situated on the combined fingerprint recognition touch screen device 160, according to another exemplary embodiment. In the example illustrated in FIG. 3, the plurality of driving lines 164 and the plurality of sensing lines 166 are arranged uniformly over the entire region of the touch panel 162. However, as described before, if there are excessively many driving lines 164 and sensing lines 166, much time is used for touch sensing and fingerprint recognition, and a manufacturing cost and power consumption for the combined fingerprint recognition touch screen device 160 may also increase. When fingerprint recognition is performed, fingerprint recognition may be possible merely with a partial region of a fingerprint rather than the entire region of the fingerprint.

Thus, as shown in FIG. 9, the driving lines 164 and the sensing lines 166 may be distributed in the form of an island on the touch panel 162. For example, the plurality of driving lines 164 may be arranged along a plurality of driving island sets 164a, 164b, 164c, and 164d, and the plurality of sensing lines 166 may be arranged along a plurality of sensing island sets 166a, 166b, 166c, and 166d. The plurality of driving lines 164 are arranged in each of the driving island sets 164a, 164b, 164c, and 164d, and the plurality of sensing lines 166 are arranged in each of the sensing island sets 166a, 166b, 166c, and 166d. For example, one driving island set 164a, 164b, 164c, or 164d and one sensing island set 166a, 166b, 166c, or 166d may have a width of about 4 mm to about 5 mm. A pitch between the driving lines 164 may be about 70 µm, a pitch between the sensing lines 166 may be about 70 µm, and about 60 to 70 driving lines and sensing lines 166 may be arranged in one driving island set 164a, 164b, 164c, or 164d and one sensing island set 166a, 166b, 166c, or 166d, respectively. Each of an interval between adjacent driving island sets 164a, 164b, 164c, and 164d and an interval between adjacent sensing island sets 166a, 166b, 166c, and 166d may be about 4 mm to about 5 mm.

When primary scanning is performed, a driving signal is sequentially applied to the first driving lines 164 among the driving island sets 164a, 164b, 164c, and 164d as indicated by solid lines in FIG. 9. For example, after a driving signal is applied to the first driving line 164 in the first driving island set 164a, a driving signal may be applied to the first driving line 164 in the second driving island set 164b, and a driving signal may be applied to the first driving line 164 in the third driving island set 164c. In this way, rough scanning may be performed over the entire region of the touch panel 162. However, the above description is merely an example, and another one may be selected from each driving island set 164a, 164b, 164c, or 164d to apply a driving signal to the selected driving line.

After primary scanning is finished, secondary scanning may be performed precisely with respect to the recognized region where the finger is situated. In the example illustrated in FIG. 9, assuming that the region marked with "A" is a region A the finger contacts on the touch panel 162, a touch is sensed in the second driving island set 164b and the third driving island set 164c. Then, in secondary scanning, a driving signal is sequentially applied to all the driving lines 164 of the second driving island set 164b and the third driving island set 164c.

Figure 10:
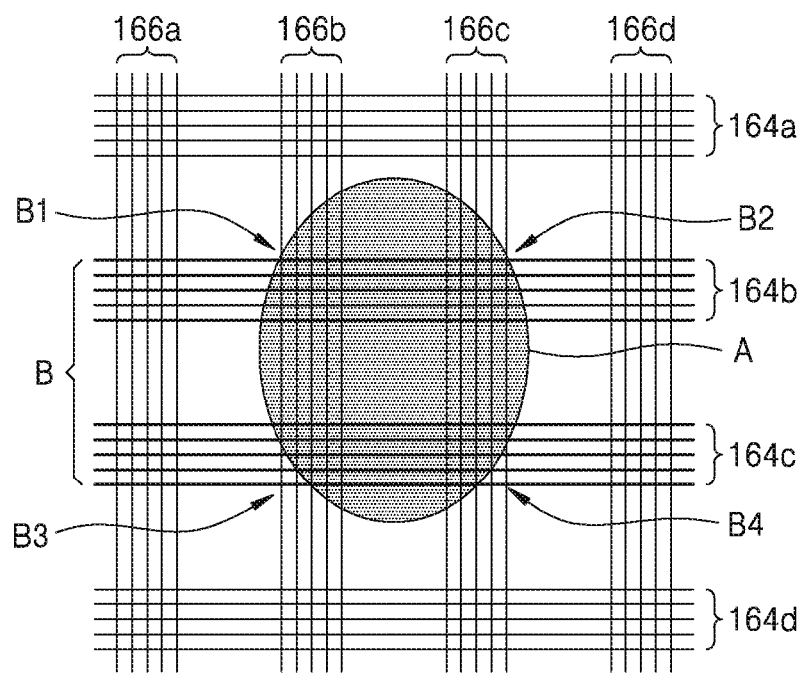
FIG. 10 is a diagram illustrating a process of performing fingerprint recognition with respect to a region where a finger is situated on a combined fingerprint recognition touch screen device, according to another exemplary embodiment.

FIG. 10 is a diagram illustrating a process of performing fingerprint recognition with respect to a region where a finger is situated in the combined fingerprint recognition touch screen device 160, according to another exemplary embodiment. As indicated with thick solid lines in FIG. 10, the driver 163 sequentially applies a driving signal to the driving lines 164 of the second driving island set 164b and the third driving island set 164c.

In this case, the secondary scanning region B may include the second driving island set 164b and the third driving island set 164c. That is, the second driving island set 164b and the third driving island set 164c including the driving lines 164 in which a touch is sensed are determined as the secondary scanning region B, and secondary scanning is performed with respect to all the driving lines 164 of the second driving island set 164b and the third driving island set 164c. Because the plurality of driving lines 164 and the plurality of sensing lines 166 are distributed along the plurality of driving island sets 164a, 164b, 164c, and 164d and the plurality of sensing island sets 166a, 166b, 166c, and 166d that are spaced apart from each other, a fingerprint image may be substantially obtained only in regions B1, B2, B3, and B4 of the secondary scanning region B where the second and third driving island sets 164b and 164c and the second and third sensing island sets 166b and 166c intersect each other. Fingerprint recognition may be sufficiently possible from fingerprint images obtained from the partial regions B1, B2, B3, and B4.

As in the example illustrated in FIG. 8, in FIG. 10, among the second and third driving island sets 164b and 164c where a touch is sensed, a capacitance variation in the last third driving island set 164c is compared with a capacitance variation in the second driving island set 164b. If a capacitance change in the third driving island set 164c is much smaller than a capacitance change in the second driving island set 164b, secondary scanning may be performed only for the second driving island set 164b except for the third driving island set 164c. That is, the secondary scanning region B may be determined as the second driving island set 164b.

The foregoing description has been made of a case in which primary scanning and secondary scanning are performed only for the driving lines 164. The signal output collector 165 receives output signals from the plurality of sensing lines 166 at the same time, and thus for the sensing lines 166, scanning of the same type as for the driving lines 164 is not necessary. However, if scanning of the same type as for the driving lines 164 is performed for outputting a touch sensing signal, primary scanning and secondary scanning may be performed with respect to the sensing lines 166 in the same manner as described for the driving lines 164.

The combined fingerprint recognition touch screen device 160 is applicable to various electric devices 100, e.g., smartphones, smart watches, etc. The touch panel 162 of the combined fingerprint recognition touch screen device 160 may be mounted on the display panel 126 of the electronic device 100. The electronic device 100 including the disclosed combined fingerprint recognition touch screen device 160 then may perform fingerprint recognition for user authentication merely with a user's touch on the display panel 126 by a finger. Therefore, there is no need to mount a separate fingerprint sensor, saving a space for the fingerprint sensor.

Figure 11:
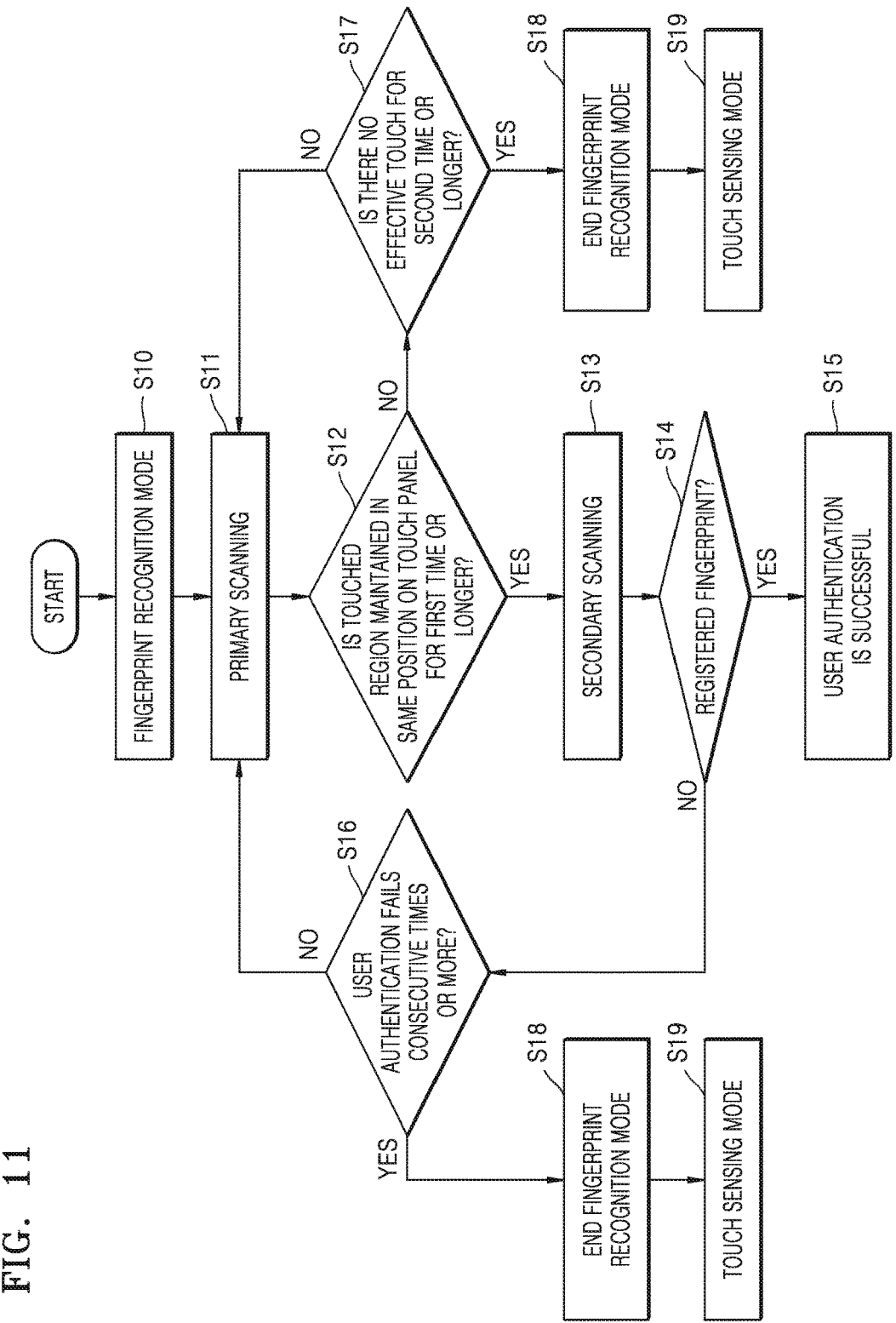
FIG. 11 is a flowchart illustrating a process of recognizing a fingerprint and performing user authentication in an electronic device including a combined fingerprint recognition touch screen device, according to an exemplary embodiment.

FIG. 11 is a flowchart illustrating a process of recognizing a fingerprint and performing user authentication in the electronic device 100 including the combined fingerprint recognition touch screen device 160, according to an exemplary embodiment. Referring to FIG. 11, in operation S10, the electronic device 100 starts a fingerprint recognition mode. If user authentication is performed in the electronic device 100 when the user presets user authentication to be performed with fingerprint recognition, the fingerprint recognition mode may start. For example, if user authentication is performed for unlocking a screen in a screen lock state of the electronic device 100, the fingerprint recognition mode may start. When user authentication is performed for performing online banking, online payment, or the like by using the electronic device 100, the fingerprint recognition mode may start.

In operation Sit the central processing unit 110 executes, for example, the fingerprint recognition module 153 that then performs primary scanning by controlling the driver 163 and the signal output collector 165 through the touch screen controller 161. For example, as described with reference to FIG. 3 or 9, a driving signal may be applied to only some of the plurality of driving lines 164, thereby rapidly and roughly performing primary scanning with respect to the entire region of the touch panel 162.

In operation S12, the electronic device 100 determines whether there is a touch by a finger for fingerprint recognition on the touch panel 162 of the electronic device 100, i.e., whether the touched region is maintained in the same position on the touch panel 162 for a first predetermined time or longer. If so, it may be determined that there is a contact by the finger for fingerprint recognition. For example, if the touched region is maintained in the same position for at least 100 ms, it may be determined that there is a contact by the finger.

If it is determined that there is the contact by the finger for fingerprint recognition on the touch panel 162, in operation S13, the fingerprint recognition module 153 performs secondary scanning by controlling the driver 163 and the signal output collector 165 through the touch screen controller 161. Secondary scanning may be performed by sequentially applying a driving voltage to all the driving lines 164 of the secondary scanning region B determined in the primary scanning operation S11. For example, secondary scanning may be performed in the manner described with reference to FIG. 5, 8, or 10. Through such secondary scanning, a high-resolution image for the touched region may be obtained.

In operation S14, the fingerprint recognition module 153 compares the image obtained in the secondary scanning operation S13 with a user's fingerprint image previously registered in the electronic device 100. If the image obtained in the secondary scanning operation S13 completely matches the user's fingerprint image, in operation S15, the electronic device 100 determines that user authentication is successful. If user authentication is successful, the screen of the electronic device 100 may be unlocked, or online banking or online payment may be performed normally. However, if the image obtained in the secondary scanning operation S13 does not match the user's fingerprint image, in operation S16, the electronic device 100 determines whether user authentication fails consecutive times or more, e.g., consecutive five times.

If user authentication fails consecutive times or more, in operation S18, an alert message may be displayed on the display panel 126 of the electronic device 100, and the fingerprint recognition mode ends. In operation S19, the process returns to a touch sensing mode in which only primary scanning is repeatedly performed. If user authentication does not fail consecutive times or more, the process returns to operation S11.

If the touched region on the touch panel 162 moves instead of being maintained in the same position, or the touch is repeated at short intervals, and thus the touch is not regarded as an effective touch for fingerprint recognition in operation S12, then the secondary scanning operation S13 is not performed. Instead, in operation S17, the electronic device 100 determines whether there is no effective touch for a second predetermined time or longer. If there is no effective touch for the second predetermined time or longer, for example, if there is no effective touch for fingerprint recognition for one second, two seconds, or longer depending on a user's setting, in operation S18, an alert message may be displayed on the display panel 126 of the electronic device 100, and the fingerprint recognition mode ends. In operation S19, the process returns to a touch sensing mode in which only primary scanning is repeatedly performed. If there is an effective touch for the second predetermined time, the process returns to operation S11.

In addition, the exemplary embodiments may also be implemented through computer-readable code and/or instructions on a medium, e.g., a computer-readable medium, to control at least one processing element to implement any of the above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A touch screen device comprising:
    a touch pad comprising first driving lines, sensing lines intersecting the first driving lines, and driving island sets that are spaced apart from each other, wherein each of the driving island sets comprises a respective portion of the first driving lines;
    a driver configured to apply a driving signal to the first driving lines;
    a signal output collector configured to receive a touch signal from the sensing lines; and
    a controller configured to control the driver and the signal output collector,
    wherein the controller is further configured to:
        control the driver to perform primary scanning to sequentially apply the driving signal to only a first single driving line of a first one of the driving island sets and then to only a second single driving line of a second one of the driving island sets;
        determine a scanning region, based on a first one of the first driving lines where a touch is sensed among the first single driving line and the second single driving line to which the driving signal is applied; and
        control the driver to perform secondary scanning to sequentially apply the driving signal to second driving lines included in the scanning region that is determined, among the first driving lines.

2. The touch screen device of claim 1, wherein the controller is further configured to control the driver to perform the primary scanning to sequentially apply the driving signal to third driving lines disposed at predetermined intervals, among the first driving lines,
    each of the predetermined intervals is of n driving lines,
    the predetermined intervals are over an entire region of the touch pad, and
    n is a natural number that is greater than 1.

3. he touch screen device of claim 1, wherein the controller is further configured to control the driver to perform the primary scanning to sequentially apply the driving signal to $(kn+m)^{th}$ driving lines disposed at predetermined intervals, starting from an $m^{th}$ driving line, among the first driving lines,
    n is a natural number that is greater than 1,
    m is a natural number that is greater than or equal to 1, and
    k is an integer that is greater than or equal to 0.

4. The touch screen device of claim 1, wherein the scanning region that is determined is from the first one of the first driving lines where the touch is sensed to a second one of the first driving lines immediately before a third one of the first driving lines where the touch is not sensed after the first one of the first driving lines.

5. The touch screen device of claim 1, wherein the controller is further configured to:
    determine whether a first contact strength in a last driving line disposed in a last position among third driving lines where the touch is sensed among the first driving lines, is less than a second contact strength in fourth driving lines among the third driving lines, by a reference value or more; and determine the scanning region to be from the first one of the first driving lines where the touch is sensed to a second one of the first driving lines immediately before the last driving line where the touch is sensed, in response to the first contact strength being determined to be less than the second contact strength by the reference value or more.

6. The touch screen device of claim 5, wherein the controller is further configured to determine the first contact strength and the second contact strength from capacitance variations respectively in the third driving lines.

7. The touch screen device of claim 1, wherein a width of each of the driving island sets is about 4 mm to about 5 mm, and an interval between each adjacent pair of the driving island sets is about 4 mm to about 5 mm.

8. The touch screen device of claim 1, wherein the controller is further configured to determine the scanning region as one of the driving island sets comprising third driving lines where the touch is sensed, among the driving island sets to which the driving signal is applied.

9. The touch screen device of claim 1, wherein a pitch between the first driving lines is about 70 μm.

10. The touch screen device of claim 1, wherein the controller is further configured to:

operate in a fingerprint recognition mode for recognizing a fingerprint or in a touch sensing mode for sensing the touch; and repeat the primary scanning in the touch sensing mode.

11. The touch screen device of claim 10, wherein the controller is further configured to, in the fingerprint recognition mode, after the primary scanning:

determine whether a touched region that is touched on the touch pad is maintained in a same position on the touch pad for a period of time or longer; and perform the secondary scanning, in response to the touched region being determined to be maintained in the same position on the touch pad for the period of time or longer.

12. An electronic device comprising:
a display panel; and
a touch screen device comprising:
a touch pad comprising first driving lines, sensing lines intersecting the first driving lines, and driving island sets that are spaced apart from each other, wherein each of the driving island sets comprises a respective portion of the first driving lines;
a driver configured to apply a driving signal to the first driving lines;
a signal output collector configured to receive a touch signal from the sensing lines; and
a controller configured to control the driver and the signal output collector, wherein the controller is further configured to:
control the driver to perform primary scanning to sequentially apply the driving signal to only a first single driving line of a first one of the driving island sets and then to only a second single driving line of a second one of the driving island sets;
determine a scanning region, based on a first one of the first driving lines where a touch is sensed among the first single driving line and the second single driving line to which the driving signal is applied; and
control the driver to perform secondary scanning to sequentially apply the driving signal to second driving lines included in the scanning region that is determined, among the first driving lines.

13. A method of driving a touch screen device comprising a touch pad comprising first driving lines, sensing lines intersecting the first driving lines, and driving island sets that are spaced apart from each other, each of the driving island sets comprising a respective portion of the first driving lines, and the method comprising:

performing primary scanning to sequentially apply a driving signal to only a first single driving line of a first one of the driving island sets and then to only a second single driving line of a second one of the driving island sets;

determining a scanning region, based on a first one of the first driving lines where a touch is sensed among the first single driving line and the second single driving line to which the driving signal is applied; and performing secondary scanning to sequentially apply the driving signal to second driving lines included in the scanning region that is determined, among the first driving lines.

14. The method of claim 13, wherein the performing of the primary scanning further comprises sequentially applying the driving signal to $(kn+m)^{th}$ driving lines disposed at predetermined intervals, starting from an $m^{th}$ driving line, among the first driving lines, n is a natural number that is greater than 1,
m is a natural number that is greater than or equal to 1, and
k is an integer that is greater than or equal to 0.

15. The method of claim 13, wherein the scanning region that is determined is from the first one of the first driving lines where the touch is sensed to a second one of the first driving lines immediately before a third one of the first driving lines where the touch is not sensed after the first one of the first driving lines.

16. The method of claim 13, further comprising determining whether a first contact strength in a last driving line disposed in a last position among third driving lines where the touch is sensed among the first driving lines, is less than a second contact strength in fourth driving lines among the third driving lines, by a reference value or more, wherein the determining of the scanning region comprises determining the scanning region to be from the first one of the first driving lines where the touch is sensed to a second one of the first driving lines immediately before the last driving line where the touch is sensed, in response to the first contact strength being determined to be less than the second contact strength by the reference value or more.

17. The method of claim 13, wherein the determining of the scanning region comprises determining the scanning region as one of the driving island sets comprising third driving lines where the touch is sensed, among the driving island sets to which the driving signal is applied.

18. The method of claim 13, further comprising:
operating in a fingerprint recognition mode for recognizing a fingerprint or in a touch sensing mode for sensing the touch; and
repeating the primary scanning in the touch sensing mode.

19. The method of claim 18, further comprising, in the fingerprint recognition mode, after the primary scanning, determining whether a touched region that is touched on the touch pad is maintained in a same position on the touch pad for a first period of time or longer, wherein the performing of the secondary scanning comprises performing the secondary scanning, in response to the touched region being determined to be maintained in the same position on the touch pad for the first period of time or longer.

20. The method of claim 19, further comprising performing a user authentication to compare an image that is obtained through the secondary scanning with a previously-registered fingerprint image.

21. The method of claim 19, further comprising:
   determining whether there is no effective touch on the touch pad for a second period of time or longer, in response to the touched region being determined to be not maintained in the same position on the touch pad for the first period of time or longer; and
   ending the fingerprint recognition mode, in response to there being determined to be no effective touch on the touch pad for the second period time or longer.

22. A touch screen device comprising:
   a touch pad comprising first driving lines, sensing lines intersecting the first driving lines, and driving island sets that are spaced apart from each other, wherein each of the driving island sets comprises a respective portion of the first driving lines;
   a driver; and
   a controller configured to:
      control the driver to sequentially apply a driving signal to only a first single driving line of a first one of the driving island sets and then to only a second single driving line of a second one of the driving island sets;
      determine a scanning region, based on a first one of the first driving lines where a touch is sensed among the first single driving line and the second single driving line to which the driving signal is applied; and
      control the driver to sequentially apply the driving signal to second driving lines included in the scanning region that is determined, among the first driving lines.

* * * * *